June 15, 1926.
W. A. COOMBS
1,589,115
PNEUMATIC DRAFT GEAR FOR THE CULTIVATING TINES OF STUMP
JUMP AGRICULTURAL IMPLEMENTS
Filed Nov. 6, 1925
2 Sheets-Sheet 1
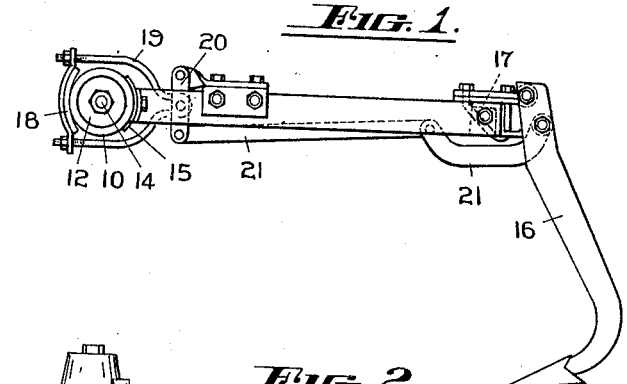
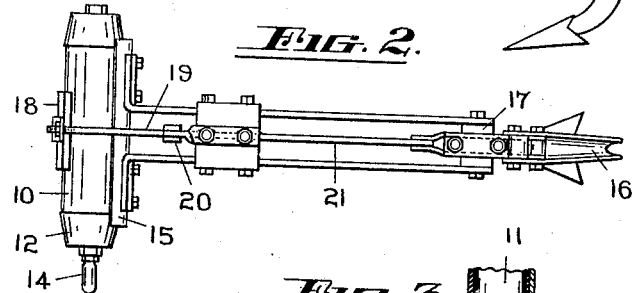
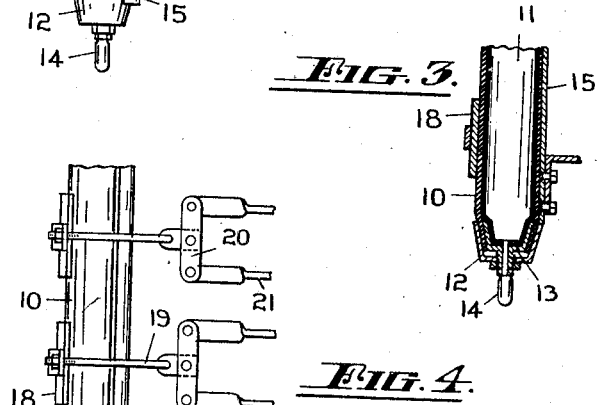
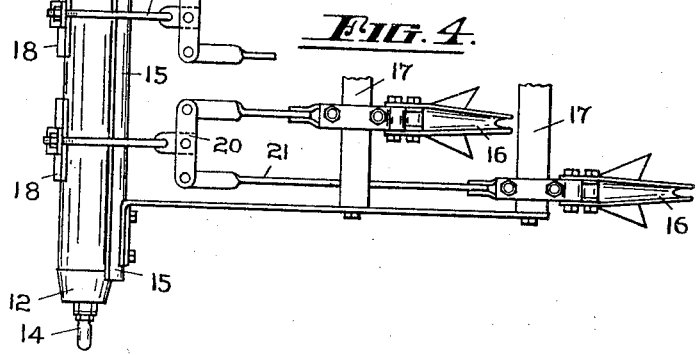
INVENTOR
WILLIAM A. COOMBS
BY
ATTORNEYS

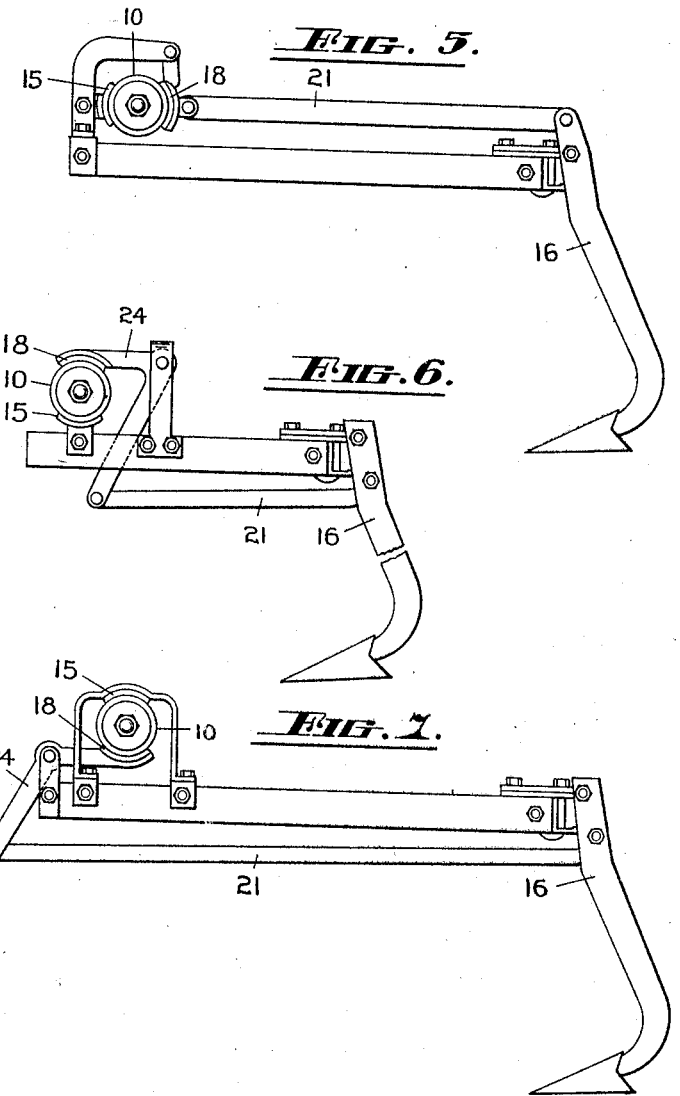

Patented June 15, 1926.

1,589,115

UNITED STATES PATENT OFFICE.

WILLIAM AUGUSTUS COOMBS, OF LANCASTER, SOUTH AUSTRALIA, AUSTRALIA.

PNEUMATIC DRAFT GEAR FOR THE CULTIVATING TINES OF STUMP JUMP AGRICULTURAL IMPLEMENTS.

Application filed November 6, 1925, Serial No. 67,372, and in Australia December 17, 1924.

This invention relates to the means for applying draft to the cultivator tines or bodies of stump jump agricultural implements; and it consists essentially in the substitution of a pneumatic cushion or cushions with suitable connections for the springs and connecting rods or other draft gear of conventional type for maintaining the draft on the tines of stump jump bodies.

It has been devised particularly for application to combined stump jump seed and fertilizer drills and cultivators, but is applicable also to plows or other stump jump implements in which draft is now applied by means of springs or by direct pull from the draft bars of the traction unit.

The application of my invention to an implement results in the elimination of all springs with their liability to breakage, a reduction of weight, better control over the draft gear as a whole, and an easier adjustment of the pressure on the tines or bodies to suit varying conditions of ground or tilling requirements.

In order that my invention may be the more clearly understood I will describe the same with reference to the accompanying drawings in which—

Figs. 1 and 2 are side and plan views respectively showing my invention as applied to a single stump jump tine;

Fig. 3 is a sectional view of one end of the pneumatic cushion;

Fig. 4 is a plan view showing my invention as applied to a plurality of stump jump tines as on a combined seed and fertilizer drill and cultivator;

Figs. 5, 6 and 7 are side views showing modifications in the manner of connecting the pneumatic cushion to the tine.

In the drawings, Figs. 1, 2 and 4, I have shown the draft device as consisting of an air cushion which is mounted in a concave breast-plate attached transversely on the frame of the machine forwardly of the tine-carrying floats or other members. This air cushion consists of an outer flexible cover 10 enclosing and protecting an inner tube 11 which contains air under pressure. The outer cover 10 is formed by a length of stout rubber and fabric tube of uniform thickness closed at the ends by metal caps 12—13. Each metal cap comprises two tapered parts, an outer part 12 and an inner part 13 which has a screw-threaded stem projecting through the centre of the outer part and fitted with a clamping nut. The end of the tube fits between the two parts 12 and 13. The inner tube 11 is closed at both ends except that at one end an air valve 14 is provided, the valve stem passing through an aperture in the metal cap of the cover.

Although I prefer to use an outer cover and inner tube the inner tube may be dispensed with and the air valve may be fitted to the outer tube 10 so that the air is confined within such outer tube without the intervention of the inner tube. In this case the ends of the tube are made airtight by the metal caps.

The construction of the pneumatic cushion above described is simple and effective but I do not confine myself thereto, and other methods of construction will be evident to manufacturers.

The air cushion 10 is fitted against a breast-plate 15 attached transversely on the frame of the implement.

The upper ends of the tines 16 are pivotally attached to the transverse bars 17 or float sections of the implement frame by any of the usual or approved pivot connections such for instance as pivot pins held by U bolts and plates or other form of clamp.

Connection between the pneumatic cushion and the tines or bodies is effected by means of saddles 18 which bear against the front of the cushion, and which are attached by bridles 19, levers 20 and connecting rods 21 to the tines.

Each saddle 18 has a substantial bearing surface against the front of the tube, and its two ends are engaged by a bridle 19 the two arms of which pass around the tube 10 and the breast-plate 15 while its rear end is connected by the rods 21 to the tine near the upper end of same. The front ends of the bridle arms are provided with adjusting nuts whereby their effective length may be increased or decreased as desired.

In Figs. 1 and 2 the saddle 18 is shown as connected to the tine 16 by means of bridle 19, lever 20 and rods 21, the upper end of the lever 20 being pivotally attached to the implement frame. In Fig. 5 a modification of this construction is shown in that the cushion 10 is positioned behind the breast-plate 15, and the saddle 18 is behind the cushion with a connecting rod 21 to an extension of the tine above its pivot. In the construction shown in Fig. 4, for the purpose of reducing the number of saddles and connecting pieces, two sets of rods 21 are used to couple two tines to the transversely placed compensating lever 20 which is attached to the bridle 19 and so to a saddle 18 upon the pneumatic cushion. In the construction shown in Fig. 6 the pneumatic cushion is positioned upon the top of the implement frame upon a horizontal breast-plate 15 and the saddle 18 is placed over the top of the cushion and beneath the one arm of a bell crank 24 (which takes the place of the bridle) its other arm being connected by a rod 21 to the tine. In Fig. 7 a modification of this construction is shown in that the cushion 10 is positioned below the breast-plate 15 and the saddle 18 is below the cushion with a bell crank 24 and connecting rod 21 connection to the tine.

In addition to the above examples it will be evident that many other modifications of the means for connecting the saddle to the tine may be employed.

The adjustable draft bridles are mounted in such manner that the tine in clearing an obstacle has a radial movement which does not excessively increase the tension applied by the pneumatic cushion.

As shown in Figs. 1 and 2 a short pneumatic cushion is used for a single tine, and as shown in Fig. 4 a single pneumatic cushion extends across the implement frame to serve a plurality of tines; but in the case of a large implement there may be two or more sections of tube, the tubes being inflated separately or by connections to a single pump. In the case of plows and like gang type implements, pneumatic cushions may be located at various points on the frame, with suitable connections to the stump jump bodies.

If desired the pneumatic cushions, saddles and connections may be protected against damage from obstacles by guard plates or bars, but none are shown in the drawings.

The air tube may be inflated to the desired pressure by means of an air pump operated manually or by mechanism driven by the ground wheels of the implement, or by a pump carried on the tractor unit. The pressure in the tube can be ascertained by reference to a gauge connected thereto or to the pump, and may be adjusted to give the degree of tension that is desired to be applied to the tines. When the tine meets a stump or other obstruction it swings backward, compressing and distorting the cushion, but the compression is very slight, and so soon as the obstruction has been passed the tine is drawn back to working position by the resiliency of the cushion. Where a number of tines are connected to the one cushion as in Fig. 4 the resistance can be altered for all of them simultaneously by simply inflating or deflating the tube to the desired pressure.

What I claim is—

1. In a stump jump implement, means for applying draft to the stump jump tine or body comprising an inflatable pneumatic cushion positioned between a breast-plate attached to the implement frame and a saddle having a connection to the stump jump tine or body.

2. In a stump jump implement embodying means for applying draft to the stump jump tine or body as specified in preceding claim 1, a pneumatic cushion comprising an outer protective cover and an inner air tube provided with an air valve whereby it may be inflated the stem of which projects through the outer cover, substantially as described.

3. In a stump jump implement embodying means for applying draft to the stump jump tine or body as specified in preceding claim 1, a pneumatic cushion comprising a tube of rubber and fabric closed at its two ends and provided with an air valve whereby it may be inflated, substantially as described.

4. In a stump jump implement, means for applying draft to the stump jump tine or body comprising an inflatable pneumatic cushion positioned against the front of a breast-plate attached to the implement frame in front of said tine or body in combination with a saddle positioned against the front of the cushion, the ends of such saddle being engaged by the arms of a bridle which passes around the cushion and the breast-plate and is attached by suitable connections to the tine or body, substantially as described.

5. In a stump jump implement, means for applying draft to a plurality of stump jump tines or bodies comprising an inflatable pneumatic cushion positioned against the front of a breast-plate attached to the implement frame in front of the tines or bodies in combination with a plurality of saddles positioned against the front of the cushion, and a connection between each saddle and one or more of the tines or bodies, substantially as described.

6. In a stump jump implement, means for applying draft to the stump jump tine or body comprising an inflatable pneumatic cushion positioned against a breast-plate attached to the implement frame in combination with a saddle positioned against the cushion on the opposite side to the breast-plate and having a bell crank and rod connection to the tine or body, substantially as described.

In testimony that I claim the foregoing as my invention I have signed my name this 23rd day of September, 1925.

WILLIAM AUGUSTUS COOMBS.